April 1, 1930.  H. W. KRANZ  1,752,992
DISK WHEEL
Filed Oct. 3, 1924
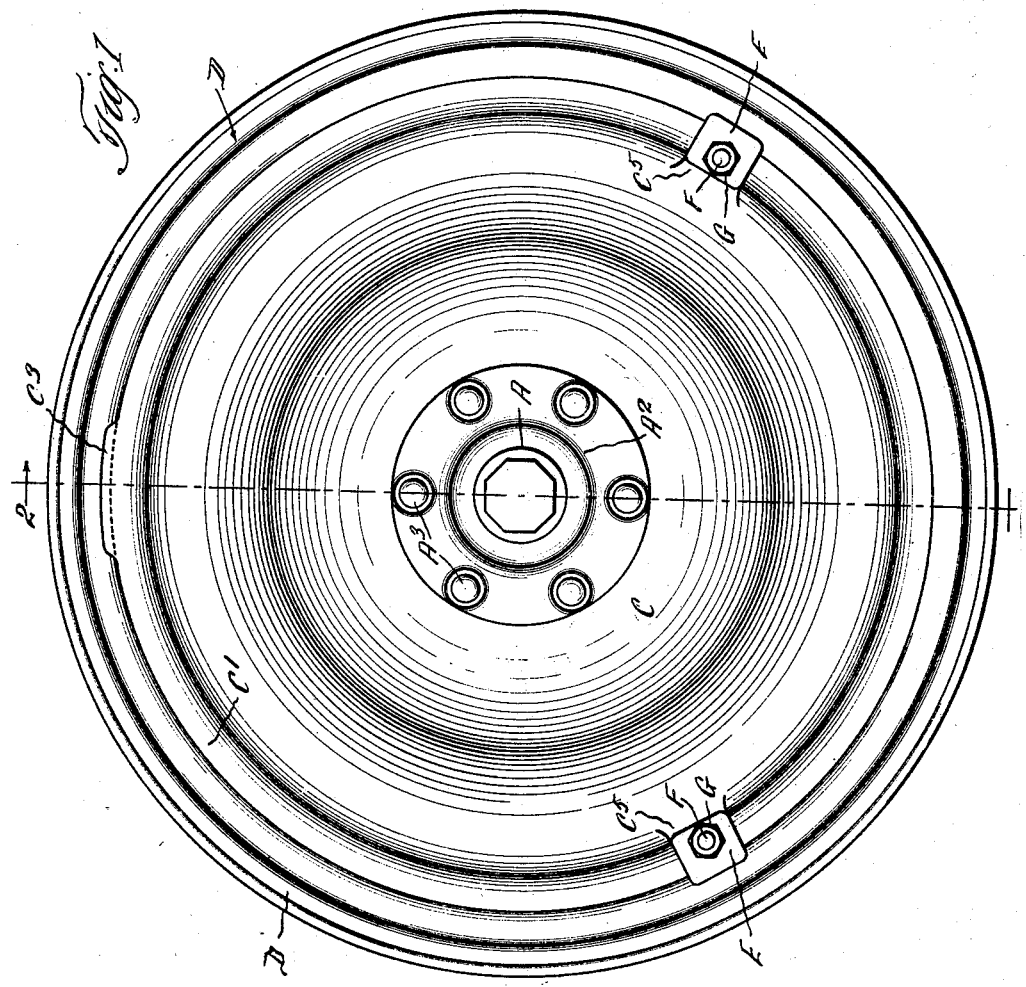
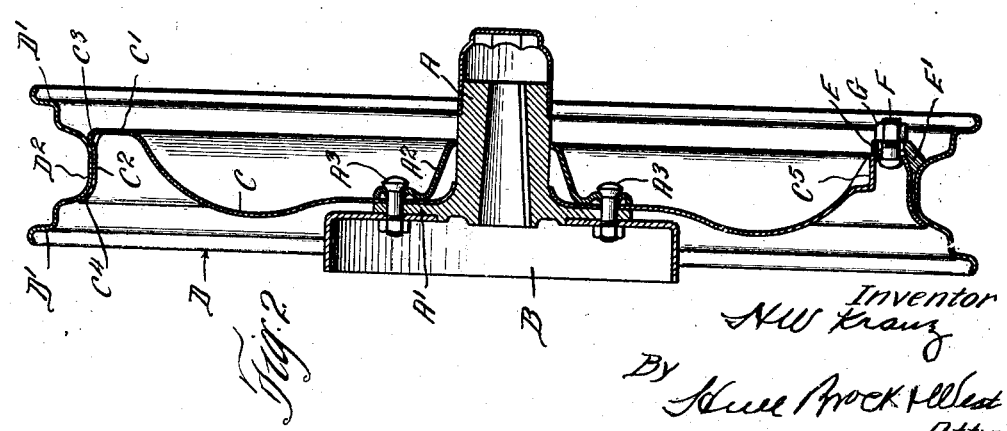
Inventor
H W Kranz
By Hull Brock & West
Attys.

Patented Apr. 1, 1930

1,752,992

UNITED STATES PATENT OFFICE

HARRY W. KRANZ, OF CLEVELAND, OHIO, ASSIGNOR, BY MESNE ASSIGNMENTS, TO THE CLEVELAND WELDING COMPANY, OF CLEVELAND, OHIO, A CORPORATION OF OHIO

DISK WHEEL

Application filed October 3, 1924. Serial No. 741,329.

This invention relates generally to vehicle wheels and more particularly to a disk wheel having a tire carrying rim demountably secured thereon.

The object of the invention is to provide a simple and easily produced disk wheel of such construction that a demountable tire carrying rim can be quickly and easily mounted and demounted with a minimum amount of rim securing means.

Another object is to provide a disk wheel and rim particularly adapted for use in connection with balloon tires which call for wheel bodies of smaller diameter than the wheel bodies heretofore employed.

With these objects in view the invention consists in the novel features of construction and in the manner of combining or arranging the same, all of which will be fully described hereinafter and pointed out in the appended claims.

In the drawings forming a part of this specification Fig. 1 is a face view of a wheel body embodying one form of my invention and Fig. 2 is a section on the line 2—2 of Fig. 1.

Referring to the drawings A indicates the hub which may be of any desired type and provided with a hub flange A' and a brake drum B can be connected to this hub flange for either front or rear wheel.

The body of the wheel is a sheet metal disk C, having a central opening to receive the hub and the central portion of this disk is shaped to conform to and contact with the hub and its flange. A flange ring $A^2$ is also employed to contact with the central portion of disk and bolts $A^3$ connect the hub and wheel disk and flange rings together and the brake drum can also be connected by these bolts if so desired.

The disk near its periphery is flat as shown at C' and is then carried laterally inwardly and channeled as shown at $C^2$ to receive the central inwardly projecting portion $D^2$ of the tire carrying rim D, said rim having tire engaging flanges D'.

The deep central groove $D^2$ permits the pushing inward of the tire casing bead, after deflation, and in this manner the casing can be removed, inasmuch as it can be lifted clear of the rim at the side opposite the point where the bead is pushed inwardly into the central depression or groove.

The channeled periphery $C^2$ of the disk C has an aperture to receive the valve stem and in line with this valve stem hole the disk is formed with an upset portion or shoulder $C^3$ which with the inner flange $C^4$ forms a saddle or seat into which the rim D can rest and the rim is then dropped down around the channeled periphery $C^2$, there being sufficient clearance; and the rim is then pushed laterally into place and secured by means of clamps E mounted upon bolts F attached to the flat portion of the disk at points substantially 120° from the shoulder $C^3$ and from each other. Nuts G are arranged upon the bolts and force the clamps inwardly so that the outer wedge shaped ends E' contact with rim base and force the rim laterally inwardly and radially outwardly and in this manner securely fastening the demountable rim to the disk wheel body. The disk can be flattened as shown at $C^5$ for the heels of the clamps to bear upon if so desired.

A wheel body constructed in accordance with my present invention therefore includes a disk having a channeled peripheral portion with a shoulder at one point and clamping wedges at oppositely spaced points, the demountable rim employed in connection with said wheel body having a central inwardly projecting portion which seats in the channeled periphery behind the shoulder and is engaged by the outer ends of the clamping wedges for the purpose of tensioning the rim upon the wheel body.

Having thus described my invention, what I claim is:

1. The combination with a disk having a channeled periphery and provided with an outwardly projecting shoulder at one point at the outer edge of said channeled periphery, of a demountable tire carrying rim having a relatively deep central inwardly projecting portion adapted to seat in the channel of the periphery and spaced clamps connected to the disk and adapted to engage the inwardly projecting portion of the rim and tension the same upon the wheel body.

2. The combination of a disk having a relatively deep channeled periphery and provided with an outwardly projecting shoulder at one point upon the outer edge of said channeled periphery, a demountable tire carrying rim having a relatively deep central inwardly projecting portion adapted to seat in the channel of the periphery, bolts carried by the disk adjacent the periphery and at points spaced from the outwardly projecting shoulder, clamping wedges arranged upon said bolts and nuts upon said bolts forcing said clamping wedges into engagement with the inwardly projecting portion of the rim and whereby said rim is tensioned upon the wheel body.

3. In a disk wheel the combination of a disk having a channeled periphery and provided with an outwardly projecting shoulder at the outer edge thereof and an inwardly and outwardly inclined flange on the inner edge thereof, of a demountable rim having a relatively deep inwardly projecting portion seating in said channel and spaced clamps connected to said disk and adapted to engage the inwardly projecting portion of said rim and tension the same upon the wheel body.

In testimony whereof, I hereunto affix my signature.

HARRY W. KRANZ.